United States Patent
Olson

(12) 
(10) Patent No.: US 10,151,473 B1
(45) Date of Patent: Dec. 11, 2018

(54) SWITCH AND ELECTRICAL OUTLET COVER ASSEMBLY

(71) Applicant: Marc Jon Olson, Columbia Heights, MN (US)

(72) Inventor: Marc Jon Olson, Columbia Heights, MN (US)

(*) Notice: Subject to any disclaimer, the term of this patent is extended or adjusted under 35 U.S.C. 154(b) by 153 days.

(21) Appl. No.: 15/391,118

(22) Filed: Dec. 27, 2016

Related U.S. Application Data

(60) Provisional application No. 62/495,022, filed on Aug. 30, 2016.

(51) Int. Cl.
  *F21V 33/00* (2006.01)
  *H01H 23/04* (2006.01)
  *H01R 13/447* (2006.01)

(52) U.S. Cl.
  CPC ........... *F21V 33/006* (2013.01); *H01H 23/04* (2013.01); *H01R 13/447* (2013.01)

(58) Field of Classification Search
  CPC ...... H01R 13/447; H01H 23/04; F21V 33/006
  See application file for complete search history.

(56) References Cited

U.S. PATENT DOCUMENTS

| | | | | |
|---|---|---|---|---|
| 4,640,564 A | * | 2/1987 | Hill | ........................ H01R 13/447 439/137 |
| 2005/0181675 A1 | * | 8/2005 | Kim | ........................ H02G 3/14 439/652 |

* cited by examiner

*Primary Examiner* — Mary Ellen Bowman
(74) *Attorney, Agent, or Firm* — Dave Alan Lingbeck

(57) ABSTRACT

A switch and electrical outlet cover assembly for displaying illuminated pictures and hanging objects thereupon. The switch and electrical outlet cover assembly includes a wall-mounted assembly including a cover member adapted to be mounted upon a wall over a wall light switch or an electrical outlet and having front and back sides and also having recessed portions disposed in the front side and extending outwardly from the back side and also openings disposed through the front and back sides.

14 Claims, 3 Drawing Sheets

SWITCH AND ELECTRICAL OUTLET COVER ASSEMBLY

CROSS-REFERENCE TO RELATED APPLICATIONS

The present application claims priority to the provisional application Ser. No. 62/495,022, filed on Aug. 30, 2016, the disclosure of which is expressly incorporated by reference herein in its entirety.

BACKGROUND OF THE INVENTION

Field of the Invention

The present invention relates to switch and electrical outlet covers and more particularly pertains to a new switch and electrical outlet cover assembly for displaying illuminated pictures and hanging objects thereupon.

Description of the Prior Art

The use of switch and electrical outlet covers is known in the prior art. More specifically, switch and electrical outlet covers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes multifunctional and configurable wall plate systems having a vertical base panel for a first utility, the vertical base panel operable for releasably attaching to a wall surface, and positioning parallel, or substantially parallel, to the wall surface during a use of the wall plate. The systems also have a second utility, as they include a configurable component for the second utility that is releasably attachable to the at least two side surfaces of the vertical base panel to provide at least two configurations of the wall plate system. In some embodiments, the panel can be repositioned radially around the vertical base panel to the at least two side surfaces, such that the position of the configurable component relative to the vertical base panel is adjustable for adding flexibility to placement of the single wall plate design. While these devices fulfill their respective, particular objectives and requirements, the aforementioned patents do not disclose a new switch and electrical outlet cover assembly.

SUMMARY OF THE INVENTION

The general purpose of the present invention, which will be described subsequently in greater detail, is to provide a new switch and electrical outlet cover assembly which has many of the advantages of the switch and electrical outlet covers mentioned heretofore and many novel features that result in a new switch and electrical outlet cover assembly which is not anticipated, rendered obvious, suggested, or even implied by any of the prior art switch and electrical outlet covers, either alone or in any combination thereof. The present invention includes a wall-mounted assembly including a cover member adapted to be mounted upon a wall over a wall light switch or an electrical outlet and having front and back sides and also having recessed portions disposed in the front side and extending outwardly from the back side and also openings disposed through the front and back sides. None of the prior art includes the combination of the elements of the present invention.

There has thus been outlined, rather broadly, the more important features of the switch and electrical outlet cover assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new switch and electrical outlet cover assembly which has many of the advantages of the switch and electrical outlet covers mentioned heretofore and many novel features that result in a new switch and electrical outlet cover assembly which is not anticipated, rendered obvious, suggested, or even implied by any of the prior art switch and electrical outlet covers, either alone or in any combination thereof.

Still another object of the present invention is to provide a new switch and electrical outlet cover assembly for displaying illuminated pictures and hanging objects thereupon.

Still yet another object of the present invention is to provide a new switch and electrical outlet cover assembly that has slots for conveniently receiving and displaying photos in a highly accessible and viewable area.

Even still another object of the present invention is to provide a new switch and electrical outlet cover assembly that allows the user to hang useful and needed objects in areas that are highly accessible and useable areas.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
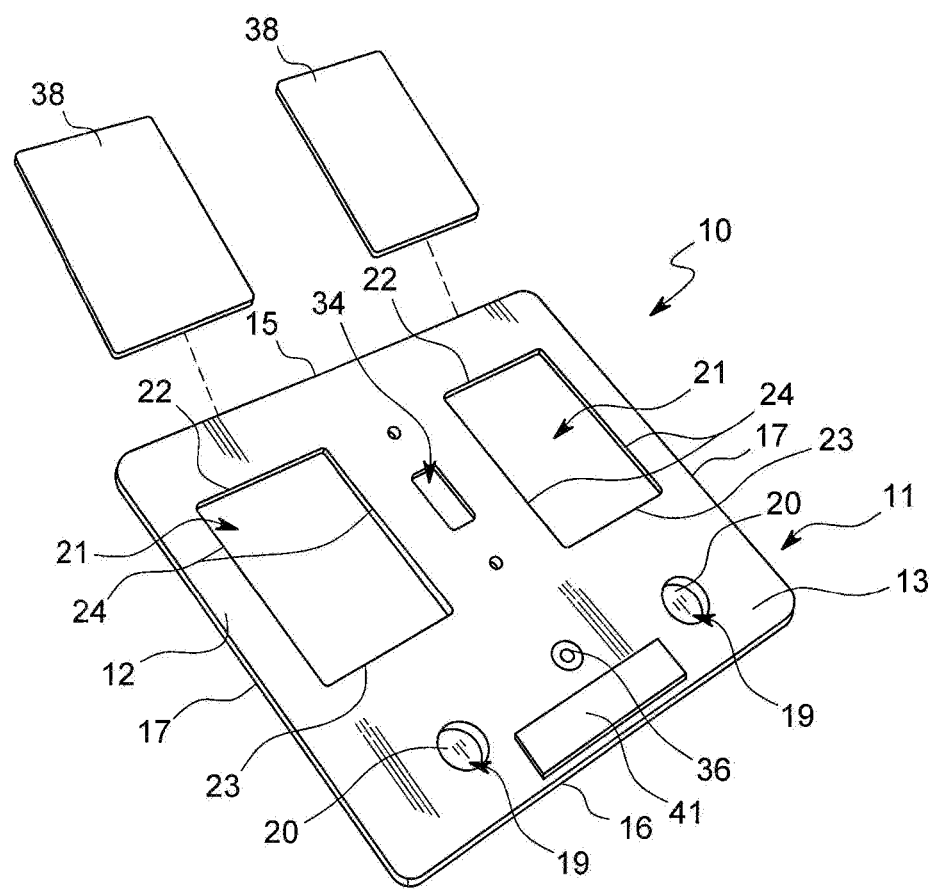
FIG. 1 is a front perspective view of a new switch and electrical outlet cover assembly according to the present invention.
Figure 2:
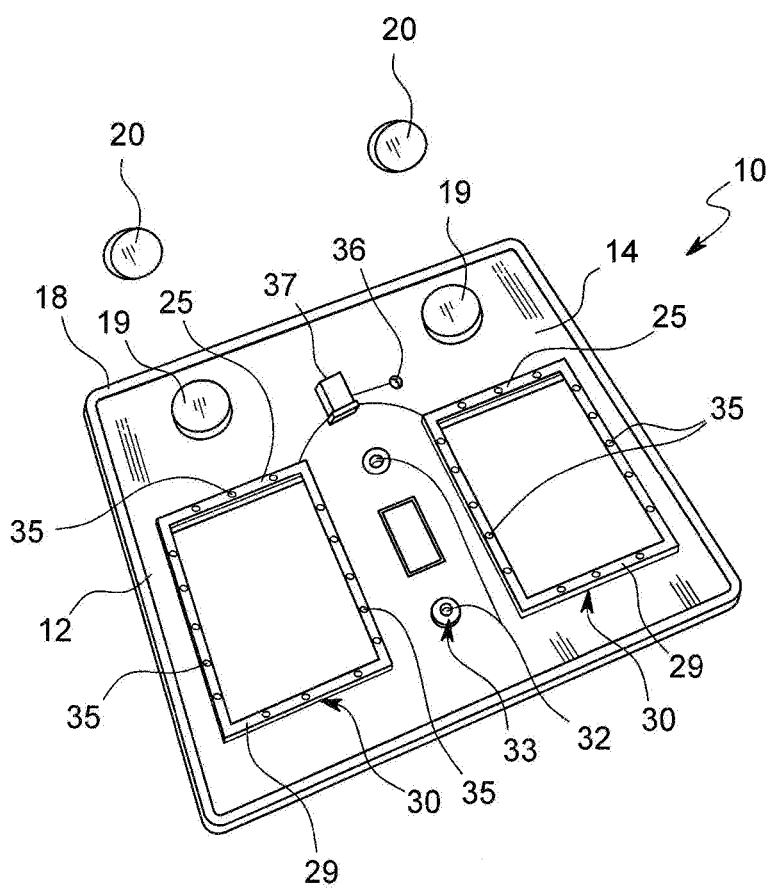
FIG. 2 is a back perspective view of the present invention.
Figure 3:
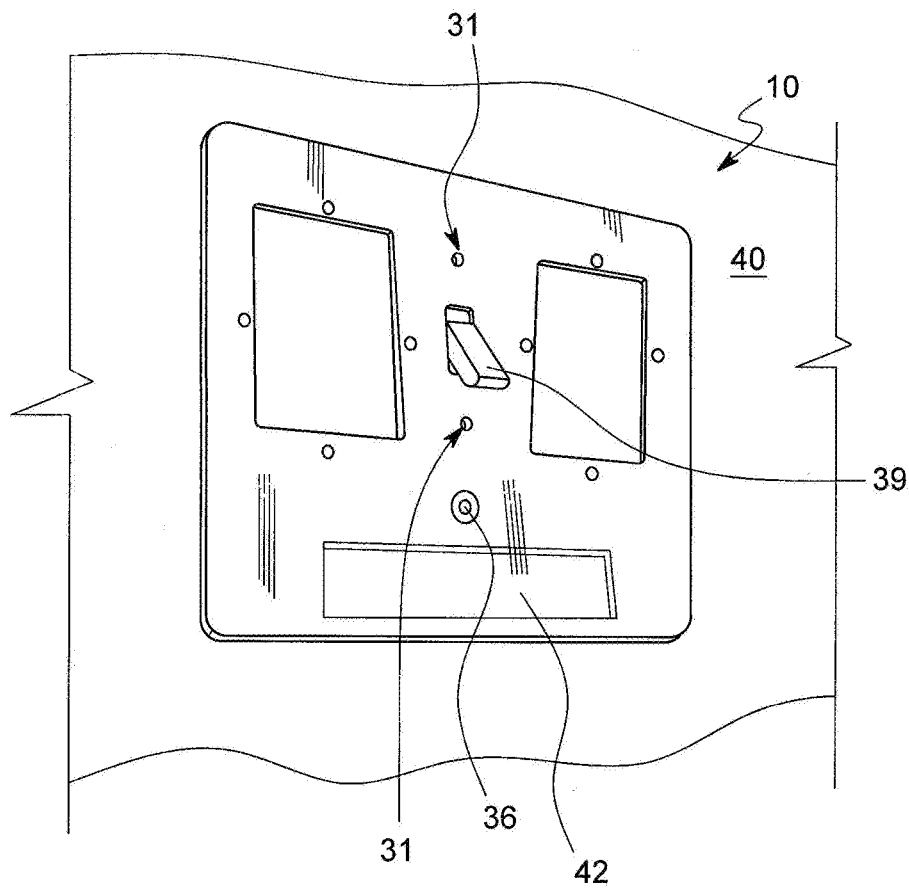
FIG. 3 is a front perspective view of a second embodiment of the present invention mounted over a light switch.
Figure 4:
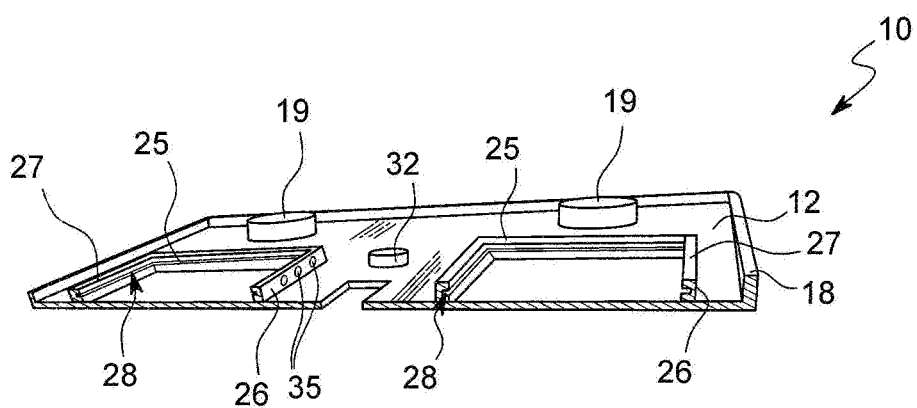
FIG. 4 is a lateral cross-sectional view of the present invention.

With reference now to the drawings, and in particular to FIGS. 1 through 4 thereof, a new switch and electrical outlet cover assembly embodying the principles and concepts of the present invention and generally designated by the reference numeral 10 will be described.

As best illustrated in FIGS. 1 through 4, the switch and electrical outlet cover assembly 10 generally comprises a wall-mounted assembly 11 including a cover member 12 adapted to be mounted upon a wall over a light switch 39 or an electrical outlet and having front and back sides 13, 14 and also having recessed portions 19 disposed in the front side 13 and extending outwardly from the back side 14 and also openings 21, 31, 34 disposed through the front and back sides 13,14. The cover member 12 has top, bottom and side edges 15-17. The cover member 12 is a face plate 12. The cover member 12 also includes a rim 18 integrally extending along the top, bottom and side edges 15-17 of the cover member 12 and protruding outwardly from the back side 14 of the cover member 12 and adapted to rest against the wall 40 and to provide a space between the wall 40 and the back side 14 of the cover member 12. The recessed portions 19 are spaced apart and disposed proximate to the bottom edge 16. The wall-mounted assembly 11 includes magnets 20 removably disposed in the recessed portions 19 to which objects can be magnetically attached to and depend from the cover member 12. As a second embodiment, the wall-mounted assembly 11 includes a strip of magnetic tape 42 conventionally attached to the front side 13 and proximate to the bottom edge 16 of the cover member 12.

As shown in FIGS. 1-4, the openings 21, 31, 34 include picture-holding openings 21 spaced apart for receiving, and displaying pictures in the picture-holding openings 21. The picture-holding openings 21 each have top, bottom and side edges 22, 23, 24 with a flange 25 integrally disposed upon the back side 14 of the cover member 12 and along the side and bottom edges 23, 24 of each of the picture-holding openings 21. The flange 25 about each of the picture-holding openings 21 has an inner portion 26 integrally attached to and extending outwardly perpendicular to the back side 14 of the cover member 12 and has an outer portion 27 angled relative to the inner portion 26 and parallel to and spaced from the back side 14 of the cover member 12 forming a slot 28 for receiving the picture. Each of the picture-holding openings 21 also has guide member 29 integral to the flange 25 and disposed along the top edge 22 and spaced from the back side 14 of the cover member 12 forming an elongated slit 30 between the back side 14 of the cover member 12 and the guide member 29 to facilitate inserting the picture in the slot 28. The wall-mounted assembly includes transparent coverings 38 each removably disposed in the slot 28 formed with the flange 25 of and disposed in a respective said picture-holding opening 21 for covering and protecting the picture (not shown) displayed in the picture-holding opening 21.

As further illustrated in FIGS. 1-4, the openings 21, 31, 34 also include fastener-receiving openings 31 disposed intermediate of the picture-holding openings 21 for receiving fasteners to attach the cover member 12 upon the wall 40. The cover member further includes bosses 32 integrally disposed over the fastener-receiving openings 31 and having bores 33 disposed therethrough which are aligned with the fastener-receiving openings 31. The openings 21, 31, 34 further include at least one switch/outlet opening 34 disposed intermediate of the picture-holding openings 21. The wall-mounted assembly 11 also includes light-emitting members 35 conventionally disposed upon the front side 13 of the cover member 12, and a power source 37 with a power switch 36 in conventional communication with the light-emitting members 35. The wall-mounted assembly 11 further includes a solar panel 41 conventionally mounted to the front side 13 of the cover member 12 below the picture-holding openings 21 and being in communication with the power source 37. The light-emitting members 35 are disposed about the picture-holding openings 21 along the top, bottom, and side edges 22-24 of the picture-holding openings 21. The light-emitting members 35 are conventionally disposed in the flange 25 about each of the picture-holding openings 21.

In use, the user inserts pictures in the slots 28 and in the picture-holding openings 21 and conventionally mounts the wall-mounted assembly 11 upon a wall 40 over a light switch 39 using conventional fasteners. The user can illuminate the pictures by depressing the power switch 36 which energizes the light-emitting members 35.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the switch and electrical outlet cover assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A switch and electrical outlet cover assembly comprising:
   a wall-mounted assembly including a cover member adapted to be mounted upon a wall over a wall light switch or an electrical outlet and having front and back sides and also having recessed portions disposed in the front side and extending outwardly from the back side and also openings disposed through the front and back sides, wherein the recessed portions are spaced apart and disposed proximate to the bottom edge of the cover member, wherein the wall-mounted assembly includes magnets removably disposed in the recessed portions to which objects can be magnetically attached to and depend from the cover member.

2. A switch and electrical outlet cover assembly comprising:
   a wall-mounted assembly including a cover member adapted to be mounted upon a wall over a wall light switch or an electrical outlet and having front and back sides and also openings disposed through the front and back sides, wherein the cover member has top, bottom and side edges, wherein the wall-mounted assembly includes a strip of magnetic tape attached to the front side and proximate to the bottom edge the of the cover member.

3. A switch and electrical outlet cover assembly comprising:
   a wall-mounted assembly including a cover member adapted to be mounted upon a wall over a wall light switch or an electrical outlet and having front and back sides and also openings disposed through the front and back sides, wherein the openings include picture-holding openings spaced apart for receiving and displaying pictures in the picture-holding openings.

4. The switch and electrical outlet cover assembly as described in claim 3, wherein the picture-holding openings each have top, bottom and side edges with a flange integrally disposed upon the back side of the cover member and along the side and bottom edges of each of the picture-holding openings.

5. The switch and electrical outlet cover assembly as described in claim 4, wherein the flange about each of the picture-holding openings has an inner portion integrally attached to and extending outwardly perpendicular to the back side of the cover member and has an outer portion angled relative to the inner portion and parallel to and spaced from the back side of the cover member forming a slot for receiving the picture.

6. The switch and electrical outlet cover assembly as described in claim 5, wherein each of the picture-holding openings also have a guide member integral to the flange and disposed along the top edge and spaced from the back side of the cover member forming an elongate slit between the back side of the cover member and the guide member to facilitate inserting the picture in the slot.

7. The switch and electrical outlet cover assembly as described in claim 5, wherein the wall-mounted assembly includes transparent coverings each removably disposed in the slot formed with the flange of and disposed in a respective said picture-holding opening for covering and protecting the picture displayed in the picture-holding opening.

8. The switch and electrical outlet cover assembly as described in claim 3, wherein the openings also include fastener-receiving openings disposed intermediate of the picture-holding openings for receiving fasteners to attach the cover member upon the wall.

9. The switch and electrical outlet cover assembly as described in claim 8, wherein the cover member further includes bosses integrally disposed over the fastener-receiving, openings and having bores disposed therethrough which are aligned with the fastener-receiving openings.

10. The switch and electrical outlet cover assembly as described in claim 3, wherein the openings further include at least one switch/outlet opening disposed intermediate of the picture-holding openings.

11. The switch and electrical outlet cover assembly as described in claim 4, wherein the wall-mounted assembly also includes light-emitting members disposed upon the cover member, and a power source with a power switch in communication with the light-emitting members.

12. The switch and electrical outlet cover assembly as described in claim 11, wherein the wall-mounted assembly further includes a solar panel mounted to the front side of the cover member below the picture-holding openings and being in communication with the power source.

13. The switch and electrical outlet cover assembly as described in claim 11, wherein the light-emitting members are disposed about the picture-holding openings along the top, bottom, and side edges of the picture-holding openings.

14. The switch and electrical outlet cover assembly as described in claim 13, wherein the light-emitting members are disposed in the flange about each of the picture-holding openings.

\* \* \* \* \*